(12) United States Patent
Borowy et al.

(10) Patent No.: US 8,499,697 B2
(45) Date of Patent: Aug. 6, 2013

(54) SYSTEM AND METHOD FOR VEHICLE POSITION SENSING WITH USE OF PROPULSION WINDINGS

(75) Inventors: Bogdan S. Borowy, San Diego, CA (US); Husam Gurol, Carlsbad, CA (US)

(73) Assignee: General Atomics, San Diego, CA (US)

( * ) Notice: Subject to any disclaimer, the term of this patent is extended or adjusted under 35 U.S.C. 154(b) by 544 days.

(21) Appl. No.: 12/390,119

(22) Filed: Feb. 20, 2009

(65) Prior Publication Data

US 2010/0212537 A1 Aug. 26, 2010

(51) Int. Cl.
*B60L 13/06* (2006.01)
(52) U.S. Cl.
USPC .......................................................... 104/284
(58) Field of Classification Search
USPC .................. 104/281, 284, 286, 290, 293, 294
See application file for complete search history.

(56) References Cited

U.S. PATENT DOCUMENTS

| 4,061,089 A | 12/1977 | Sawyer |
| 5,628,252 A * | 5/1997 | Kuznetsov ..................... 104/284 |
| 5,722,326 A | 3/1998 | Post |
| 6,044,770 A | 4/2000 | Davey et al. |
| 6,085,663 A | 7/2000 | Powell et al. |
| 6,129,025 A | 10/2000 | Minakami et al. |
| 6,152,045 A | 11/2000 | Powell et al. |
| 6,510,799 B2 | 1/2003 | Lamb et al. |
| 6,827,022 B2 | 12/2004 | van den Bergh et al. |
| 2004/0035315 A1 | 2/2004 | Richards |

* cited by examiner

*Primary Examiner* — R. J. McCarry, Jr.
(74) *Attorney, Agent, or Firm* — Nydegger and Associates

(57) ABSTRACT

A system and method are provided for determining the position of a vehicle on a guideway. For operation, the vehicle includes a magnet system having a wavelength "$\lambda$". Further, the guideway includes a propulsion winding for carrying a propulsion current. Structurally, the propulsion winding includes a series of sections, with each section having a wavelength "$\lambda$". Further, the propulsion winding includes "N" coils linearly aligned along the guideway, with a phase difference of "$\lambda/N$" between adjacent coils. Importantly, a transmitter is located on the vehicle for emitting a position current that interacts with the propulsion winding to produce a signal in each coil. Also, the system includes a trap connected to each coil for receiving each respective signal, and a processor for resolving the respective signals to determine the position of the vehicle on the guideway.

15 Claims, 2 Drawing Sheets

SYSTEM AND METHOD FOR VEHICLE POSITION SENSING WITH USE OF PROPULSION WINDINGS

FIELD OF THE INVENTION

The present invention pertains generally to systems for passively sensing the position of a magnetically levitated (MAGLEV) vehicle on a guideway. More particularly, the present invention pertains to position sensing systems that utilize a transmitter mounted on the vehicle for emitting a high frequency current used to locate the vehicle. The present invention is particularly, but not exclusively, useful as a position sensing system that communicates a high frequency signal from the vehicle through the propulsion winding to determine the position of the vehicle on the guideway for use in maximizing efficient propulsion of the vehicle.

BACKGROUND OF THE INVENTION

Magnetic levitation systems, often called MAGLEV systems, use magnetic fields to levitate and propel a vehicle over a stationary guideway. Specifically, a current is passed through linear synchronous motor (LSM) windings mounted on a track. This current then interacts with a magnet system mounted on the vehicle to generate propulsion of the vehicle. In order to use the LSM windings to accelerate, decelerate and maintain the vehicle at a constant speed, the phase, amplitude and frequency of the current in the LSM windings must be accurately controlled at all times. Specifically, the propulsion current passing through the LSM windings must be synchronized with respect to the position of the vehicle. Therefore, it is extremely important that the position of the vehicle with respect to the track, and the windings therein, be monitored and communicated to the propulsion control system.

Currently, optical sensors exist for determining the location of MAGLEV vehicles relative to their guideways. However, these optical sensors require use of a "piano key" tape that must be maintained clean, dry and in good condition. Otherwise, accidental pulses are generated by the optical sensors which can lead to errors in LSM magnet flux position detection that will result in erroneous operation of the propulsion of the MAGLEV vehicle.

In light of the above, it is an object of the present invention to provide systems suitable for the purposes of determining the position of a vehicle over a guideway that are stable and accurate. It is another object of the present invention to provide a vehicle position determining system that provides passive sensing. It is yet another object of the present invention to provide a MAGLEV vehicle position sensing system that communicates the location of the vehicle through the propulsion windings to a system controller. Still another object of the present invention is to provide a MAGLEV vehicle position sensing system that can be used to optimize the interaction of the propulsion current in the propulsion winding along the guideway with the magnet system on the vehicle, for propulsion of the vehicle. It is still another object of the present invention to provide a MAGLEV vehicle position sensing system that operates in all weather conditions. It is another object of the present invention to provide a MAGLEV vehicle position sensing system that works at all operational speeds. Yet another object of the present invention is to provide a MAGLEV vehicle position sensing system which consumes low amounts of power, is easy to use, relatively simple to implement, and comparatively cost effective.

SUMMARY OF THE INVENTION

The present invention is directed to a system for determining the position of a MAGLEV vehicle along a stationary guideway. In functional overview, the system is designed to determine the vehicle position so that the proper phase, amplitude and frequency of the current in the LSM windings can be accurately controlled at all times.

For operation, a magnet system with a wavelength "$\lambda$" (such as an array of permanent magnets in a Halbach array, an electromagnet, or a superconducting magnet configuration) is mounted on the vehicle. Further, a propulsion winding is located on the guideway for carrying a propulsion current. Structurally, the propulsion winding includes "N" number of coils that are positioned in a series of sections, with each section having a wavelength "$\lambda$". For propulsion of the vehicle, the three coils are linearly aligned along the guideway, and appear once in each section. As a result, each pair of adjacent coils has a phase difference of "$\lambda/N$". In operation, a section of coils on the guideway will interact with the magnet system on the vehicle to propel the vehicle.

In addition to propelling the vehicle, the coils on the guideway are also used as a position reference. For this purpose, a transmitter is located at a predetermined location on the vehicle for emitting a high-frequency, narrow-band position current. In operation, the position current interacts with the propulsion winding to produce a high-frequency, narrow-band signal in each coil in the propulsion winding. Preferably, the signal has a frequency of about 100 kHz.

In order to identify and receive the high-frequency signals in the propulsion winding, the system includes "N" traps. Specifically, each trap is dedicated and connected to a respective coil in the propulsion winding. Further, each trap comprises a resonant circuit that is tuned to the high frequency so that noise from the propulsion current is ignored.

Also, the system includes a processor for collectively normalizing the respective signals from each of the coils. As a result, the processor may determine the position of the vehicle on the guideway. As stated above, the position of the vehicle is used to control the characteristics of the propulsion current to maximize the interaction of the propulsion current with the magnet system on the vehicle during propulsion of the vehicle.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENTS

Figure 1:
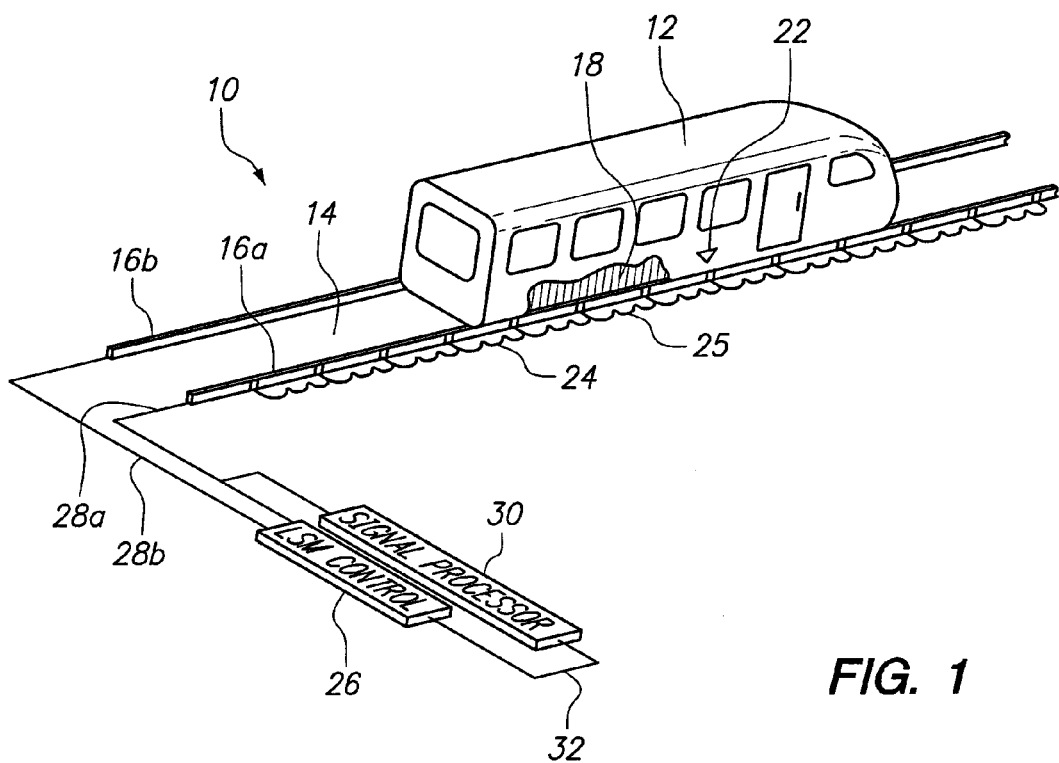
FIG. 1 is a perspective view of a position sensing system for a MAGLEV vehicle traveling along a guideway.

Referring to FIG. 1, a position sensing system in accordance with the present invention is shown and generally designated 10. As shown in FIG. 1, the system 10 includes a MAGLEV vehicle 12 provided for levitation over and travel along a guideway 14. Although a vehicle 12 is shown for the system 10, it is to be appreciated that the system 10 can levitate and propel other objects and is not limited to the levitation and propulsion of manned vehicles. In any case, the vehicle 12 will travel along rails 16 in the guideway 14, of which the rails 16a and 16b are exemplary. Also, the vehicle 12 will include a magnet system 18, such as a linear array of magnets, affixed to or mounted on the vehicle 12. Further, the vehicle 12 is provided with a transmitter 22, such as a race track drive coil, for emitting a position current. For purposes of the present invention, the transmitter 22 is positioned at a known location on the vehicle 12 with a known spatial relationship to the magnet system 18.

As shown in FIG. 1, the guideway 14 includes a propulsion winding 24 for carrying a propulsion current. As shown, the propulsion winding 24 includes a plurality of successive sections 25. Further, the propulsion winding 24 is connected to a control 26 for a Linear Synchronous Motor (LSM) (not shown). More specifically, the LSM control 26 is used to move the vehicle 12 in a manner well known in the pertinent art. This propulsion of the vehicle 12 is possible, due to connections between LSM control 26 and the rail 16a via line 28a, and/or rail 16b via line 28b. Importantly, for the system 10 of the present invention, the LSM control 26 uses input from a signal processor 30 for its operation. This interconnection is accomplished by line 32 shown between the signal processor 30 and the LSM control 26 in FIG. 1. The exact nature of the input provided by signal processor 30 for the operation of LSM control 26 will be explained below.

Figure 2:
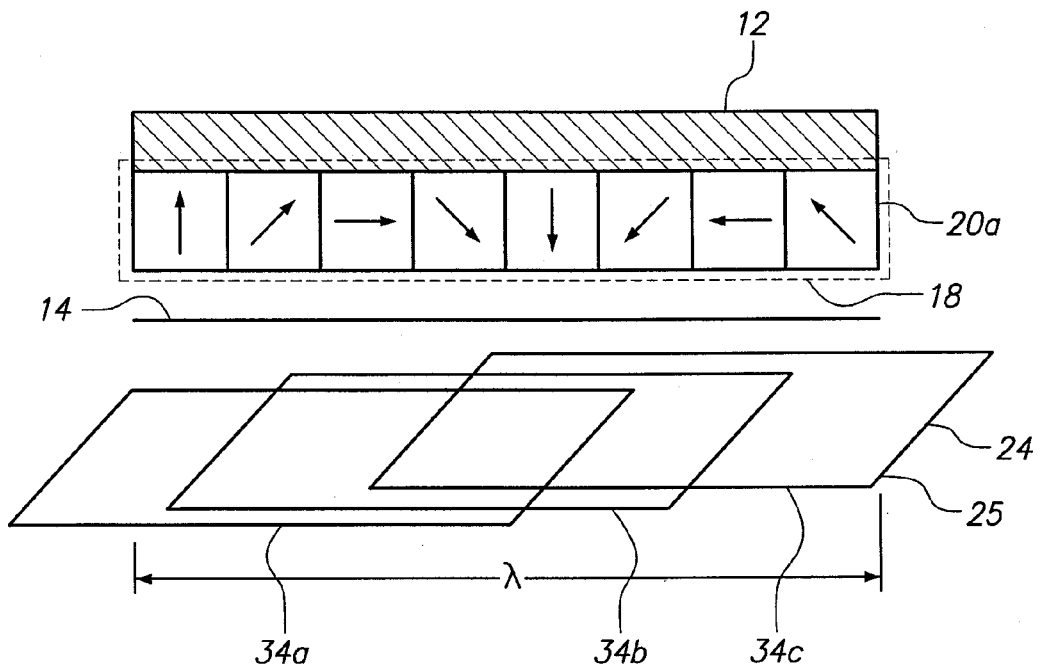
FIG. 2 is an elevation view of the magnets and a perspective view of the propulsion windings shown in FIG. 1 in accordance with the present invention.

First, the structure of an exemplary magnet system 18 and the associated propulsion winding 24 is shown in FIG. 2. In FIG. 2, the illustrated magnets, of which magnet 20a is exemplary, constitute a wavelength, λ, of a Halbach array. As shown in FIG. 2, for one wavelength, the magnet system 18 has an array of eight magnets, of which magnet 20a is exemplary, (each shown with its magnetic field vector) arranged linearly along the direction of the guideway 14. It is to be appreciated that because of the arrangement of the individual magnets (see exemplary magnet 20a) in the magnet system 18, the orientation of the magnetic field (i.e. the field vector) rotates along the guideway 14. It is to be further appreciated that within the plane of the page, the vertical component of the magnetic field varies sinusoidally along the guideway 14. FIG. 2 shows the wavelength, λ, of this sinusoidal variation.

It is to be appreciated that a number of configurations for establishing one or more wavelengths, λ, of magnetic field along the guideway 14 may be used. For example, four, eight, twelve, sixteen or some other multiple of four magnets, of which magnet 20a is exemplary, can be appropriately arranged to establish a magnetic field having a vertical component that varies sinusoidally through one wavelength λ, along the guideway 14. Additionally, one can imagine single strips of magnetic material magnetized to produce one wavelength, λ, of sinusoidally varying magnetic field along the guideway 14. Alternatively, the use of non-permanent magnets, such as electrically energized coils, may be employed to establish one wavelength, λ, of sinusoidally varying magnetic field along the guideway 14.

Further, in FIG. 2, a section 25 of the propulsion winding 24 is shown to include "N" separate coils 34 and has a wavelength, λ. In the illustrated section 25, N=3, and the three coils 34a, 34b, 34c are linearly aligned in the section 25 such that there is a phase difference of "λ/N" or "λ/3" between adjacent coils 34 in each section 25. For the present invention, however, there will actually be a plurality of sections 25. Thus, from the linear alignment of coils 34 shown in FIG. 2, a first section 25 of the propulsion winding 24 can be envisioned to include coils 34a, 34b, 34c. An adjacent section 25' (not shown) will then sequentially include coils 34b, 34c, 34a. The next section 25" (also not shown) includes coils 34c, 34a, 34b. And so on.

Figure 3:
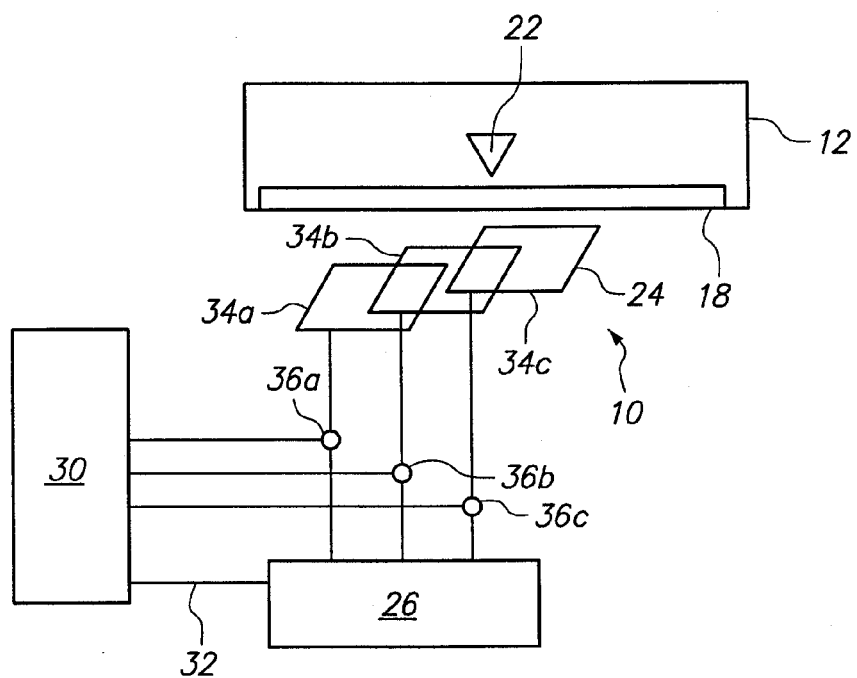
FIG. 3 is a schematic view of the position sensing system.

Referring now to FIG. 3, the use of the coils 34 in the position sensing system 10 is illustrated. As shown, each coil 34a, 34b, 34c in a section 25 (as shown in FIG. 2) is provided with a propulsion current from the LSM control 26. Further, in FIG. 3, each coil 34a, 34b, 34c is connected to a respective dedicated trap 36a, 36b, 36c. For the system 10, each trap 36 comprises a resonant circuit tuned to the high frequency emitted by the transmitter 22. As a result, the traps 36 effectively ignore the noise and low frequency currents resulting from the propulsion current and can identify the signal created in the coils 34 by the transmitter 22. Further, each trap 36 is connected to the processor 30. As a result, when the traps 36 have identified the high frequency signal from the transmitter 22, it is communicated to the processor 30. In response, the processor 30 collectively normalizes the respective signals from each of the coils 34 to determine the position of the vehicle 12 on the guideway 14. Then, the processor 30 communicates with the LSM control 26 to control the propulsion current to maximize the interaction of the propulsion current in the propulsion winding 24 along the guideway 14 with the magnet system 18 on the vehicle 12 for propulsion of the vehicle 12.

In determining the absolute position of the vehicle 12, the coils 34a, 34b, 34c in a section 25 of the propulsion winding 24 constitute an orthogonal basis for the signal transmission. Specifically, the high-frequency position current in the transmitter 22 generates a magnetic flux that penetrates the coils 34a, 34b, 34c of the propulsion winding 24. Further, the resultant amplitude of the three generated voltages in the propulsion winding 24 is proportional to a coupling between the transmitter 22 and each of the coils 34a, 34b, 34c in the propulsion winding 24.

$$y_A = \Psi_m(g)\sin(2\pi f_c t)\cos\left(\frac{2\pi}{\lambda}x\right)$$

$$y_B = \Psi_m(g)\sin(2\pi f_c t)\cos\left(\frac{2\pi}{\lambda}\left(x - \frac{\lambda}{3}\right)\right)$$

$$y_C = \Psi_m(g)\sin(2\pi f_c t)\cos\left(\frac{2\pi}{\lambda}\left(x + \frac{\lambda}{3}\right)\right)$$

These three modulated voltages are superimposed with the pulse width modulated (PWM) voltages generated by the inverter and the back electromagnetic field (EMF) of the LSM. Also, the modulation technique allows for much of the pulse width modulation and other noise suppression by utilizing a Band-Pass (BP) filter or notch filtering. The computation of the position information from the retrieved three low frequency position dependent voltages is as follows:

$$y_{A\_Demod} = \Psi_m(g)\cos\left(\frac{2\pi}{\lambda}x\right)$$

$$y_{B\_Demod} = \Psi_m(g)\cos\left(\frac{2\pi}{\lambda}\left(x - \frac{\lambda}{3}\right)\right) = \Psi_m(g)\cos\left(\frac{2\pi}{\lambda}x - \frac{2\pi}{3}\right)$$

$$y_{C\_Demod} = \Psi_m(g)\cos\left(\frac{2\pi}{\lambda}\left(x - \frac{2\lambda}{3}\right)\right) = \Psi_m(g)\cos\left(\frac{2\pi}{\lambda}x + \frac{2\pi}{3}\right)$$

Further processing of the signals converts the three-vector basis to a normalized two-vector basis:

$$Y = \frac{y_{C\_Demod} - y_{B\_Demod}}{\sqrt{3}} = \Psi_m(g)\frac{\cos\left(\frac{2\pi}{\lambda}x + \frac{2\pi}{3}\right) - \cos\left(\frac{2\pi}{\lambda}x - \frac{2\pi}{3}\right)}{\sqrt{3}} = $$

$$\Psi_m(g)\frac{2\sin\left(\frac{2\pi}{\lambda}x\right)\sin\left(\frac{2\pi}{3}\right)}{\sqrt{3}} = \Psi_m(g)\sin\left(\frac{2\pi}{\lambda}x\right)$$

$$\hat{X} = \tan^{-1}\left(\frac{Y}{y_{A\_Demod}}\right) = \tan^{-1}\left(\frac{\Psi_m(g)\sin\left(\frac{2\pi}{\lambda}x\right)}{\Psi_m(g)\cos\left(\frac{2\pi}{\lambda}x\right)}\right) = \tan^{-1}\left(\tan\left(\frac{2\pi}{\lambda}x\right)\right) = \frac{2\pi}{\lambda}x$$

As a result, the estimate of the position, x, is $$\frac{2\pi}{\lambda}x,$$

a scaled value of the position, x.

While the particular System and Method for Vehicle Position Sensing with use of Propulsion Windings as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims. Further, it is noted that while the illustrations describe a winding having three coils, other pluralities of coils are envisioned for use.

What is claimed is:

1. A system for determining a position of a vehicle on a guideway which comprises:
   a magnet system mounted on the vehicle, wherein the magnet system has a wavelength "$\lambda$";
   a propulsion winding located on the guideway for carrying a low frequency propulsion current, wherein the propulsion current is provided by a control for a Linear Synchronous Motor (LSM), and wherein the propulsion winding includes at least one section having a wavelength "$\lambda$", and each section has "N" coils linearly aligned along the guideway, with a phase difference of "$\lambda/N$" between adjacent coils in the section;
   a transmitter located on the vehicle for emitting a position current, with said position current interacting with the propulsion winding to produce a high frequency signal in each coil therein;
   a signal trap connected to each coil in the propulsion winding for receiving isolating the high frequency signal from the low frequency propulsion current, wherein the signal trap is a resonant circuit that is tuned to receive the high frequency signal produced by the transmitter interacting with the propulsion winding and to filter out the low frequency propulsion current; and
   a processor for collectively normalizing the high frequency signals from each of the coils to continuously determine position data for the vehicle on the guideway for use of the position data by the LSM control to synchronize an interaction of the propulsion current in the propulsion winding along the guideway with the magnet system on the vehicle, for maximizing propulsion of the vehicle.

2. A system as recited in claim 1 wherein N=3, and wherein the propulsion winding includes a first coil, a second coil, and a third coil, wherein the first coil, the second coil, and the third coil are linearly aligned in each section of the propulsion winding, and wherein the first coil is connected to a first signal trap, the second coil is connected to a second signal trap, and the third coil is connected to a third signal trap.

3. A system as recited in claim 1 wherein each signal is high frequency narrow-band.

4. A system as recited in claim 3 wherein each high frequency signal has a frequency of about 100 kHz.

5. A system for determining a position of a vehicle on a guideway which comprises:
   a magnet system mounted on the vehicle, wherein the magnet system has a wavelength "$\lambda$";
   a propulsion winding located on the guideway for carrying a low frequency propulsion current, wherein the propulsion current is provided by a control for a Linear Synchronous Motor (LSM), and wherein the propulsion winding includes at least one section having a wavelength "$\lambda$", and each section has "N" coils linearly aligned along the guideway, with a phase difference of "$\lambda/N$" between adjacent coils in the section;
   a means mounted on the vehicle for emitting a position current, with said position current interacting with the propulsion winding to produce a high frequency signal in each coil therein;
   a means electrically connected to each propulsion winding for isolating the high frequency signal from noise created by the low frequency propulsion current on each respective coil in the propulsion winding; and
   a means for resolving the high frequency signals from each of the coils to continuously determine position data for the vehicle on the guideway for use of the position data by the LSM control to synchronize an interaction of the low frequency propulsion current in the propulsion winding along the guideway with the magnet system on the vehicle, for maximizing propulsion of the vehicle.

6. A system as recited in claim 5 wherein each isolating means is a signal trap tuned to receive the high frequency signal and to filter out the low frequency propulsion current.

7. A system as recited in claim 6 wherein the isolation means includes a first signal trap, a second signal trap, and a third signal trap, wherein the propulsion winding includes a first coil, a second coil, and a third coil that are linearly aligned in each section of the propulsion winding, and wherein the first coil is connected to the first signal trap, the second coil is connected to the second signal trap, and the third coil is connected to the third signal trap.

8. A system as recited in claim 7 wherein each signal trap comprises a resonant circuit tuned to the high frequency signal.

9. A system as recited in claim 5 wherein each signal is high frequency narrow-band.

10. A system as recited in claim 9 wherein each high frequency signal has a frequency of about 25 kHz to about 100 kHz.

11. A method for determining a position of a vehicle on a guideway which comprises the steps of:
   mounting a magnet system on the vehicle, wherein the magnet system has a wavelength "$\lambda$",
   locating a propulsion winding on the guideway for carrying a low frequency propulsion current, wherein the propulsion current is provided by a control for a Linear Synchronous Motor (LSM), and wherein the propulsion winding includes at least one section having a wavelength "$\lambda$", and each section has "N" coils linearly aligned along the guideway, with a phase difference of "$\lambda/N$" between adjacent coils in the section;
   placing a transmitter on the vehicle;

emitting a position current from the transmitter, with said position current interacting with the propulsion winding to produce a high frequency signal in each coil therein;

isolating each high frequency signal from noise produced by the low frequency propulsion current on each respective coil in the propulsion winding using a signal trap connected to each coil in the propulsion winding; and resolving the high frequency signals from each of the coils to continuously determine position data for the vehicle on the guideway for use of the position data by the LSM control to synchronize an interaction of the low frequency propulsion current in the propulsion winding along the guideway with the magnet system on the vehicle, for maximizing propulsion of the vehicle.

12. A method as recited in claim 11 further comprising the step of connecting a signal trap to each coil to perform the isolation step.

13. A method as recited in claim 12 wherein each signal trap is tuned to receive a high frequency signal and filter noise from the low frequency propulsion current.

14. A method as recited in claim 13 wherein each high frequency signal has a frequency of about 100 kHz.

15. A method as recited in claim 12 wherein the propulsion winding includes a first coil, a second coil, and a third coil that are linearly aligned in each section of the propulsion winding, and wherein the first coil is connected to a first signal trap, the second coil is connected to a second signal trap, and the third coil is connected to a third signal trap.

* * * * *